(12) United States Patent
Naftali-Menajed

(10) Patent No.: US 9,083,665 B2
(45) Date of Patent: *Jul. 14, 2015

(54) METHODS AND SYSTEMS TO DISPLAY A VIDEO IN AN EMAIL

(71) Applicant: Vidiense Technology Pty Ltd., Lennox Head, NSW (AU)

(72) Inventor: Clemente Naftali-Menajed, Quebec (CA)

(73) Assignee: Vidiense Technology Pty Ltd, Lennox Head, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,525

(22) Filed: Oct. 30, 2013

(65) Prior Publication Data

US 2014/0059149 A1    Feb. 27, 2014

Related U.S. Application Data

(63) Continuation of application No. 12/746,360, filed as application No. PCT/CA2008/002112 on Dec. 5, 2008, now Pat. No. 8,601,071.

(30) Foreign Application Priority Data

Dec. 7, 2007    (CA) ...................................... 2613821

(51) Int. Cl.
*H04L 12/58*        (2006.01)
(52) U.S. Cl.
CPC ................ *H04L 51/10* (2013.01); *H04L 12/58* (2013.01)
(58) Field of Classification Search
CPC ................................ H04L 51/10; H04L 12/58

USPC ......................................................... 709/206
See application file for complete search history.

(56) References Cited

U.S. PATENT DOCUMENTS

| | | | | |
|---|---|---|---|---|
| 5,557,320 | A | * | 9/1996 | Krebs ........................... 725/114 |
| 6,009,462 | A | | 12/1999 | Birrell et al. |
| 6,317,795 | B1 | * | 11/2001 | Malkin et al. ................. 709/246 |
| 6,411,725 | B1 | * | 6/2002 | Rhoads ......................... 382/100 |

(Continued)

FOREIGN PATENT DOCUMENTS

| | | | |
|---|---|---|---|
| CN | 1245005 | C  * | 3/2006 |
| JP | 2005286663 | | 10/2005 |

(Continued)

OTHER PUBLICATIONS

Office Action dated Mar. 21, 2012, from Russian Patent Application No. 2010127438/07(039053), 9 pages.

(Continued)

*Primary Examiner* — Kostas Katsikis
(74) *Attorney, Agent, or Firm* — Jones Day

(57) ABSTRACT

Methods and systems are disclosed for displaying a first video in an html compliant email on a computerized device. The method may comprise defining a predetermined number of frames to be included in the first video and creating at least one first video file comprising the frames. In embodiments, the frames may be ordered in a selected sequence. The method may also comprise storing the first video file on a server and embedding a link in an html code of the email to automatically call the first video file from the server and to display the video frames of the first video file in an email page of the email when the email is opened or otherwise viewed.

13 Claims, 3 Drawing Sheets

(56) References Cited

U.S. PATENT DOCUMENTS

| | | | |
|---|---|---|---|
| 6,421,726 | B1 | 7/2002 | Kenner et al. |
| 6,449,635 | B1 | 9/2002 | Tilden, Jr. et al. |
| 6,513,069 | B1 * | 1/2003 | Abato et al. ............... 709/238 |
| 6,578,070 | B1 | 6/2003 | Weaver et al. |
| 6,760,429 | B1 * | 7/2004 | Hung et al. .............. 379/265.09 |
| 6,792,449 | B2 * | 9/2004 | Colville et al. ............... 709/215 |
| 7,020,177 | B2 | 3/2006 | Leeper et al. |
| 7,124,165 | B1 | 10/2006 | Barraclough et al. |
| 7,194,513 | B2 | 3/2007 | Sharif et al. |
| 7,352,953 | B1 | 4/2008 | Hogan |
| 7,401,122 | B2 | 7/2008 | Chen |
| 7,428,580 | B2 | 9/2008 | Hullfish et al. |
| 7,529,940 | B1 | 5/2009 | Winkel et al. |
| 7,562,150 | B2 | 7/2009 | Patterson |
| 7,596,285 | B2 | 9/2009 | Brown et al. |
| 7,631,191 | B2 | 12/2009 | Glazer et al. |
| 7,751,683 | B1 | 7/2010 | Belknap |
| 7,996,878 | B1 | 8/2011 | Basso et al. |
| 2002/0059397 | A1 | 5/2002 | Feola et al. |
| 2002/0078158 | A1 | 6/2002 | Brown et al. |
| 2002/0078454 | A1 | 6/2002 | Auberger |
| 2002/0129089 | A1 | 9/2002 | Hegde et al. |
| 2003/0009385 | A1 | 1/2003 | Tucciarone et al. |
| 2003/0046348 | A1 | 3/2003 | Pinto et al. |
| 2003/0122922 | A1 | 7/2003 | Saffer et al. |
| 2003/0177193 | A1 | 9/2003 | Budge et al. |
| 2003/0208543 | A1 * | 11/2003 | Enete et al. ............... 709/206 |
| 2004/0045040 | A1 | 3/2004 | Hayward |
| 2004/0095396 | A1 | 5/2004 | Stavely et al. |
| 2005/0034162 | A1 | 2/2005 | White et al. |
| 2005/0066339 | A1 * | 3/2005 | Thoen ............... 719/328 |
| 2005/0080878 | A1 | 4/2005 | Cunningham et al. |
| 2005/0086313 | A1 | 4/2005 | Lucas et al. |
| 2005/0144235 | A1 * | 6/2005 | Bednall ............... 709/206 |
| 2005/0281470 | A1 | 12/2005 | Adams |
| 2006/0085513 | A1 | 4/2006 | Malik |
| 2006/0089754 | A1 | 4/2006 | Mortenson |
| 2006/0190401 | A1 | 8/2006 | Akadiri |
| 2006/0228029 | A1 | 10/2006 | Zhang et al. |
| 2006/0242663 | A1 | 10/2006 | Gogerty |
| 2007/0067407 | A1 | 3/2007 | Bettis et al. |
| 2007/0168866 | A1 | 7/2007 | Khare et al. |
| 2007/0244977 | A1 | 10/2007 | Atkins |
| 2007/0288574 | A1 | 12/2007 | Koster et al. |
| 2008/0005266 | A1 | 1/2008 | Fein et al. |
| 2008/0086689 | A1 | 4/2008 | Berkley et al. |
| 2008/0109522 | A1 | 5/2008 | Chiang |
| 2008/0127289 | A1 | 5/2008 | Julia et al. |
| 2008/0273670 | A1 | 11/2008 | Dickinson |
| 2008/0275762 | A1 | 11/2008 | Cutler et al. |
| 2008/0313011 | A1 | 12/2008 | Rose et al. |
| 2008/0320512 | A1 | 12/2008 | Knight |
| 2009/0007216 | A1 | 1/2009 | Ku et al. |
| 2009/0049490 | A1 | 2/2009 | White |
| 2009/0049495 | A1 * | 2/2009 | Ketterling et al. ............ 725/112 |
| 2009/0070673 | A1 | 3/2009 | Barkan et al. |
| 2009/0143007 | A1 | 6/2009 | Terlizzi |
| 2009/0204903 | A1 | 8/2009 | Edelen et al. |
| 2009/0205002 | A1 | 8/2009 | Massiah |
| 2009/0248524 | A1 | 10/2009 | Defoy et al. |
| 2010/0036719 | A1 | 2/2010 | Eklund |
| 2010/0062750 | A1 | 3/2010 | Nurminen et al. |
| 2010/0094703 | A1 | 4/2010 | Bramley et al. |

FOREIGN PATENT DOCUMENTS

| | | |
|---|---|---|
| WO | WO 0141446 A1 * | 6/2001 |
| WO | WO 01/10127 | 8/2001 |
| WO | WO 01/59599 | 8/2001 |
| WO | WO 01/61508 | 8/2001 |
| WO | WO 0193101 A2 * | 12/2001 |
| WO | WO 0244950 A2 * | 6/2002 |
| WO | 2006092810 | 9/2006 |
| WO | 2009015339 | 1/2009 |

OTHER PUBLICATIONS

"Convert video to gif for email+Twilight demo"; STYLECampaign (website), Dec. 31, 2008 Retrieved Jul. 27, 2012 from the internet URL:<http://stylecampaign.com/blog/ 2008/12/convert-video-to-gif-for-email-twilight-demo/>, 10 pages.

Premick, Justin; "New Way to Send Video Emails?"; Aweber Communications (website), Jan. 2009 Retrieved Jul. 27, 2012 from the Internet URL:< http://www.aweber.com/blog/email-marketing/new-way-to-send-video-emails.htm>, 13 pages.

"How Video Message Gets Viewed by 59% of Target Audience"; MarketingSherpa, LLC. (website), May 22, 2007 Retrieved Jul. 27, 2012 from the internet URL:< http://www.marketingsherpa.com/article.php?ident=29985>, 4 pages.

Office Action dated May 17, 2011, from Canadian Patent Application No. 2,613,821, 4 pages.

Examination Report dated May 15, 2012, from Singapore Patent Application No. 201003953-5, 7 pages.

Prior Art Search Report dated Aug. 8, 2012, from Griffith Hack, 12 pages.

First Office Action dated Mar. 22, 2012, issued in Mexican Application No. MX/a/2010/006196, 7 pages (w/ partial English translation).

European Examination Report, Application No. 08 857 531.1, mailed Dec. 29, 2011, 3 pages.

Palme, Jacob; "Sending HTML in MIME, an informational supplement to the RFC: MIME Encapsulation of Aggregate Documents, such as HTML"; 2001, Network Working Group, pp. 1-20.

Internet page of the Web Application Technology Working Group: http://lists.whatwg.org/pipermail/whatwg-whatwg.org/attachments/20070228/6a0cdddc/attachment.txt, published on Mar. 7, 2007 as per the Waybackmachiile, 3 paQes.

Palme, Jacob; "Sending HTML in MIME, an informational supplement to the RFC: MIME Encapsulation of Aggregate Documents, such as HTML (MHTML}"; 2001, Internet draft of RFC2026, 20 pages.

Office Action dated Jul. 22, 2011 from European Patent Application No. 08857531.1, 5 pages.

Internet page of the Web Application Technology Working Group: http://lists.whatwg.org/pipermail/whatwg- whatvvg.org/attachments/20070228/6a0cdddc/attachment.txt, 2007, 2 pages.

Search/Examination Report dated Oct. 10, 2010 from European Patent Application No. 08857531.1, 7 pages.

Bulterman, D., et al., "SMIL 2.1 Extended Mobile Profile," W3C Recommendation, 17 pages downloaded Dec. 14, 2010 from URL: http://www.w3.orgffR/2005/REC-SMIL2-20051213/smil21-extended-mobile-profile.html.

Bulterman, D., et al., "SMIL 2.1 Mobile Profile," W3C Recommendation, 14 pages downloaded Dec. 14, 2010 from URL: http://www.w3.orgffR/2005/REC-SMIL2-20051213/smil21-mobile-profile.html.

Bulterman, D., et al., "Synchronized Multimedia Integration Language (SMIL 2.1)," W3C Recommendation, Dec. 13, 2005, Copyright2005, 15 pages downloaded Dec. 14, 2010 from URL: http://www.w3.orgffR/2005/REC-SMIL2-20051213/cover.html.

Bulterman, D., et al., "The SMIL 2.1 Animation Modules," W3C Recommendation, 43 pages downloaded Dec. 14, 2010 from URL: http:www.w3.orgffR/2005/REC-SMIL2-20051213/animation.html.

Bulterman, D., et al., "The SMIL 2.1 Layout Modules," W3C Recommendation, 36 pages downloaded Dec. 14, 2010 form URL: http://www.w3.orgffR/2005/REC-SMIL2-20051213/layout.html.

Bulterman, D., et al., "The SMIL 2.1 Media Object Modules," W3C Recommendation, 17 pages downloaded Dec. 14, 2010 from URL: http://www.w3.orgffR/2005/REC-SMIL2-20051213/extended-media-object.html.

Bulterman, D., et al., "The SMIL 2.1 Timing and Synchronization Module," W3C Recommendation, 110 pages downloaded Dec. 14, 200 from URL: http://www.w3.org/TR/2005/REC-SMIL2-20051213/smil-timing.html.

International Preliminary Report on Patentability and Written Opinion mailed Feb. 18, 2009 from International Patent Application No. PCT/CA2008/002112, 9 pages.

(56) References Cited

OTHER PUBLICATIONS

Search/Examination Report dated Nov. 10, 2010 from the Canadian Patent Office for Canadian Application No. 2,613,821, 12 pages.
Grassel, G., et al., "The SMIL 2.1 Transition Effects Module," W3C Recommendation, 38 pages downloaded Dec. 14, 2010 from URL: http://www.w3.org/TR/2005/REC-SMIL2-20051213/smil-transitions.html.
Layaida, N., et al., "SMIL 2.1 Basic Profile and Scalability Framework," W3C Recommendation, 8 pages downloaded Dec. 14, 2010 from URL: http://www.w3.org/TR/2005/REC-SMIL2-20051213/smil-basic.html.
Layaida, N., "SMIL 2.1 Language Profile," W3C Recommendation, 21 pages downloaded Dec. 14, 2010 from URL: http://www.w3.org/TR/2005/REC-SMIL2-20051213/smil21-profile.html.
Michel, T., "About SMIL 2.1," W3C Recommendation, 3 pages downloaded Dec. 14, 2010 from URL: http://www.w3.org/TR/2005/REC-SMIL2-20051213/introduction.html.
Michel, T., et al., "The SMIL 2.1 Content Control Modules," W3C Recommendation, 18 pages downloaded Dec. 14, 2010 from URL: http://www.w3.org/TR/2005/REC-SMIL2-20051213/smil-content.html.
Michel, T., et al., "The SMIL 2.1 Linking Modules," W3C Recommendation, 15 pages downloaded Dec. 14, 2010 from URL: http://www.w3.org/TR/2005/REC-SMIL2-20051213/extended-linking.html.
Michel, T., "The SMIL 2.1 Metainformation Module," W3C Recommendation, 5 pages downloaded Dec. 14, 2010 from URL: http://www.w3.org/TR/2005/REC-SMIL2-20051213/metadata.html.
Michel, T., "The SMIL 2.1 Modules," W3C Recommendation, 16 pages downloaded Dec. 14, 2010 from URL: http://www.w3.org/TR/2005/REC-SMIL2-20051213/smil-modules/html.
Michel, T., et al., "The SMIL 2.1 Structure Module," W3C Recommendation, 4 pages downloaded Dec. 14, 2010 from URL: http://www.w3.org/TR/2005/REC-SMIL2-20051213/structure.html.
Michel, T., et al., "The SMIL 2.1 Time Manipulations Module," W3C Recommendation, 18 pages downloaded Dec. 14, 2010 from URL: http://www.w3.org/TR/2005/REC-SMIL2-20051213/smil-timemanip.html.

Notice of Acceptance mailed Dec. 16, 2010 from the Australian Patent Office for Australian Patent Application No. 2008331384, 3 pages.
Ossenbruggen, J. v., et al, "Appendix A: SMIL 2.1 DTDs," W3C Recommendation, Copyright 2005,43 pages downloaded Dec. 14, 2010 from URL: http://www.w3.org/TR/2005/REC-SMIL2-20051213/smii-DTD.html.
W3C®, "Appendix B: Index of SMIL 2.1 Modules," W3C Recommendation, 2 pages downloaded Dec. 14, 2010 from URL: http://www.w3.org/TR/2005/REC-SMIL2-20051213/modules.html.
W3C®, "Appendix C: Index of SMIL 2.1 Elements, "W3C Recommendation, 2 pages downloaded Dec. 14, 2010 from URL: http://www.w3.org/TR/2005/REC-SMIL2-20051213/elements.html.
W3C®, "Appendix D: Index of SMIL 2.1 Attributes," W3C Recommendation, 5 pages downloaded Dec. 14, 2010 from URL: http://www.w3.org/TR/2005/REC-SMIL2-20051213/attributes.html.
W3C®, "Appendix E: SMIL 2.1 References, E.1 Normative References," W3C Recommendation, 8 pages downloaded Dec. 14, 2010 from URL: http://www.w3.org/TR/2005/REC-SMIL2-20051213/refs.html.
"Simple Animated Gif in Email Lifts Conversions 49%- Test Results"; http://www.marketingsherpa.com/barrier.html?ident=29932#, accessed on Jul. 2, 2010, 4 pages.
Singer, Michael; "MindArrow Hits the Mark with Video E-Mail"; 2002, http://www.internetnews.com/bus-news/article.php/1465191, 2 pages.
"Copy and Paste to E-Mail"; 2002, http://www.computing.net/answers/windows-xp/copy-and-paste-to-email/28201.html, 3 pages.
"TheManBehindTheCurtain"; 2003, http://www.cre8siteforums.com/index.ghg?showtogic=69534, 2 pages.
"Marketing Your Website"; 1998, Multimedia Communications Case Study Seminar, IEEE, pp. 2/1-2/5.
http:www.awebar.com/blog/email-marketing/new-way-to-send-video-emails.htm, accessed on Jun. 23, 2009.
Search/Examination Report dated Oct. 15, 2010, from Australian Patent Application No. 2008331384, 2 pages.

* cited by examiner

METHODS AND SYSTEMS TO DISPLAY A VIDEO IN AN EMAIL

CROSS-REFERENCE TO RELATED APPLICATIONS

The present patent application is a continuation of U.S. application Ser. No. 12/746,360, filed Aug. 20, 2010, which is the National Phase application of International Application No. PCT/CA2008/002112 filed Dec. 12, 2008, which designates the United States and was published in English, and claims the benefits of priority of Canadian Patent Application No. 2,613,821, filed on Dec. 7, 2007. Each of these applications, in their entirety, are incorporated herein by reference.

FIELD OF THE INVENTION

The present inventions generally relate to the display of a video in an email that is opened or viewed on a computerized device, more particularly to the display of a video in an email that does not require any video player to be installed or executed on the computerized device to be viewed.

BACKGROUND OF THE INVENTION

Email marketing is the most cost-effective way for marketers to establish interactive relationships with their customers and prospects.

Video ads are significantly more effective at engaging viewers because they can capture attention of more of the viewer's senses by communicating the three Vs: Visual, Vocal, and Verbal. Communication research has proven that a mere 7% of a message is perceived through words, 38% is through the tone of the presenter, and 55% is through seeing the presenter's body language. Video communicates the other 93% of an advertising message that the viewer receives beyond a simple graphic with text.

The challenge for today's email marketer is to stand out in the receiver's crowded inbox with a compelling and entertaining message. The first issue is getting the message into the inbox through the corporate firewall and spam filter. The second is creating content that will compel viewers to engage with the ad and 'click-through' to your web site to interact with your message. Indeed, marketers have only 3 seconds to grab the viewer's attention. The third is to provide the irresistible offer that the viewer can easily register to accept. And, finally the campaign must have the tracking metrics in place to measure effectiveness.

There is thus a need to provide an email that attracts more traffic to a particular web site and to augment the number of subscriptions, sales or registrations for a product or an event. Furthermore, the email should display quickly to grab the user's attention.

OBJECTS OF THE INVENTION

A first object of the present invention is to provide an email in which a video is displayed without the need to execute or install a player.

A second object of the present invention is to display a video in an email that plays instantly when the email is opened or viewed.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The present invention provides an email in which a first video is displayed when the email is opened or viewed on a computerized device. If the user clicks on the email page, a web page is opened, referred to as the landing page in the present document. The landing page displays a second video and other information related to the topic of the email and/or the first or second video. Finally, another web page may be opened or accessed, referred to as the launch page. The launch page may contain, for example, details for special events, event registration, event notification, turnkey e-commerce site, product launch page, special services, special promotions, master corporate website home page, artist page, movie page.

The first video, displayed in the email page, does not need any player to be viewed on the computerized device. One of the main advantages of the present invention is that there is no delay to begin the display of the first video. Another advantage is that the email will not be blocked or targeted as a virus or spam by most firewall and anti-virus. The email page is custom programmed and integrated into an HTML (Hyper Text Markup Language) file, which can be inserted into most popular email delivery programs.

The first step to create the first video file is to define the frame elements to be included in it. The frame elements may be images or frames coming from videos. The images may be, for example, JPEG images, PNG images, PSD images (PHOTOSHOP™) or AI files (ADOBE™ ILLUSTRATOR™ files). The video frames may come from various digital video inputs (AVI, MPEG, MPEG2, MPEG 4, MOV, RAM, VOB, WMV, MOVPortable Media) or come from an analog form from digital video tapes (beta, VHS, mini DV) converted to a digital format. The first video may also be an animation. The frames can have any dimensions and are not limited to a rectangular shape. The first video file may also comprise audio components that may be, for example, WAV files, MP3 files or any other suitable format.

The chosen frames are ordered in a particular sequence and the first video file is created using an off the shelf software package. A new video file format has been created for this purpose, the CVI™ format. It is possible to display the first video file for a particular number of times in the email page. In this case, the html code of the email is implemented to create loops according to the desired number of times chosen previously. The loops are programmed by a consumer third party off the shelf software.

The first video file having a CVI™ format is then posted on a server which is programmed to recognize the CVI™ format.

To display the first video file in an email, a hot link is embedded in the html code of the email. The hot link calls the first video file, which is stored on the sever, and sequentially displays the video frames in the email. The hot link is a mechanism where two applications are linked together so that changes to one will affect the other. Thus, the hot link provides a link between the email and the first video file located on the server to sequentially display the frames of the first video on a computerized device. The email page preferably integrates the first video and graphic content artwork and text into a complete design layout.

A frame editing system may be provided for the selection and the ordering of the frames of the first video file by different parties. The frames can be added, deleted, and re-ordered to create the first video file without the need to have an editing system. Reviews are made in sync using the frame by frame feature of the custom CLEMSTAR™ Video Player. The reviewing step can occur simultaneously in an unlimited number of geographical locations via the internet, enhancing significantly the review time.

The CLEMSTAR™ player has been developed using action script in the MACROMEDIA™ software development environment. The player can be custom branded for a company for the web video delivery solution in the landing page (special custom programming required). The length of the second video displayed in the landing page can be as large as the server can store.

All the files are custom programmed and integrated into an HTML (Hyper Text Markup Language) file. The completed video landing page HTML file is posted on a server.

The landing page may be automatically opened when the display of the first video file is finished, or after a predetermined period. The landing page comprises a second video file and may comprise graphic components, such as graphical image files (JPEG or PNG images for example) or text. The second video may come from a digital or an analog input. The second video is preferably translated to a larger uncompressed video quality.

Preferably, the video player of the landing page instantly analyses the bandwidth of the computerized device and determines which video feed is best for the connection, allowing the player to start streaming with minimal delay, while providing a high quality streaming video. An automatic bandwidth detector can be a real performance booster to accelerate the time for the delivering of the video playback. It has been noticed that in North America the recipient bandwidth varies all the time depending on a company's bandwidth distribution and time of day. In order to achieve the quickest play back with minimal wait time, the second video is encoded in several bandwidths. The bandwidth detector typically buffers for several seconds. Viewers have experience 0-5 seconds to buffer a whole 2 hours movie, for any operating system (WINDOWS™, MAC™, OR UNIX™).

To further minimize the delay to see the second video of the landing page, the download of this second video may begin as soon as the email is opened or viewed. When the landing page is opened, a portion of the video has yet been buffered.

The video player of the landing page may be programmed to automatically launch to the desired web launch page when the second video is finished. It is also possible to combine both previous web pages in only one web page.

The features of the present invention, which are believed to be novel, are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel video email will be described hereinafter. Although the invention is described in terms of specific illustrative embodiment(s), it is to be understood that the embodiment(s) described herein are by way of example only and that the scope of the invention is not intended to be limited thereby.

Figure 1:
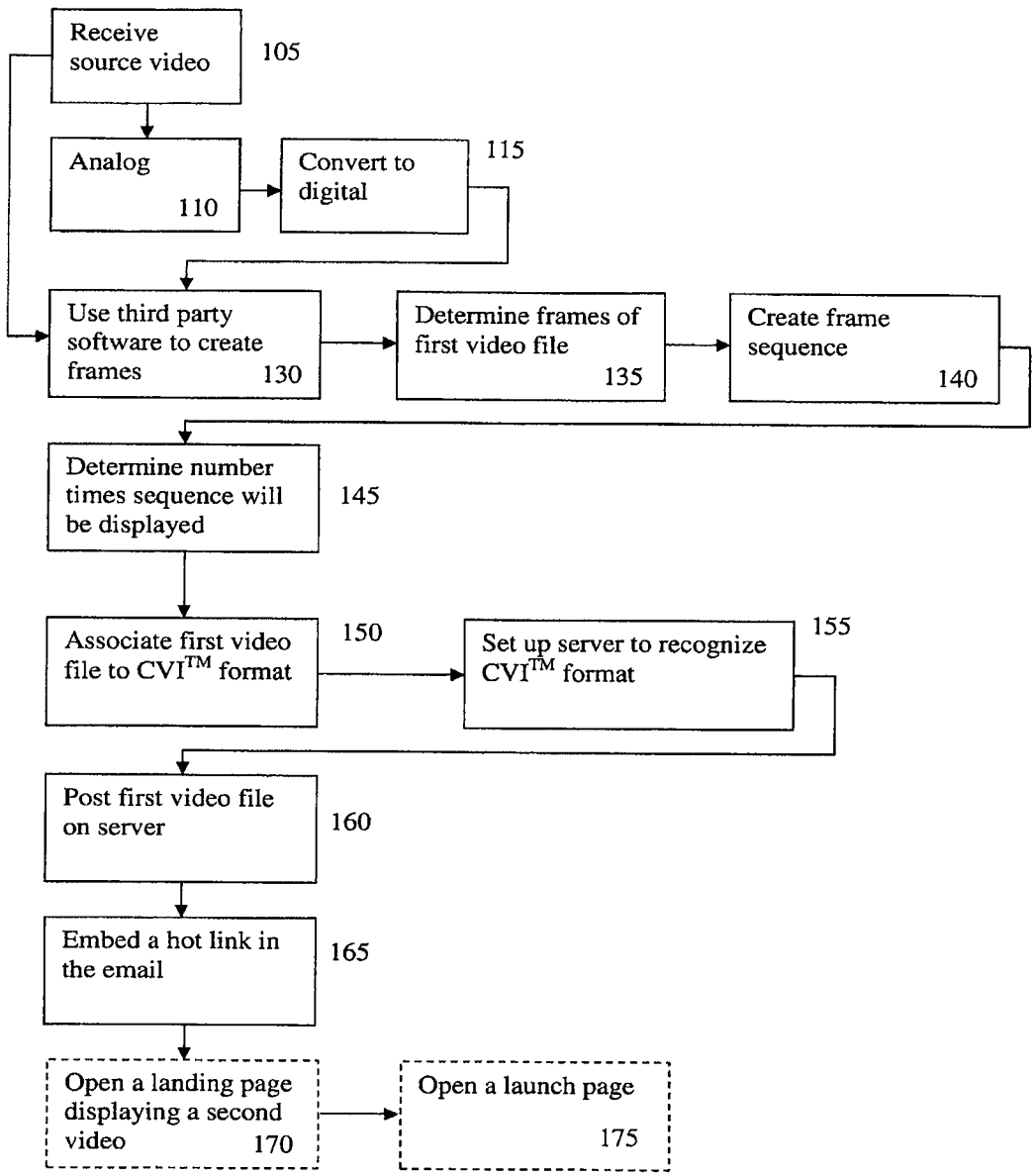
FIG. 1 is a diagram showing the steps to create the first video file.

In FIG. 1, the steps to create the first video to be displayed in an email are shown in a flowchart. The first video file is constituted by a plurality of frames coming typically from a source video 105. If the source video is analog 110, it is converted 115 into a digital video.

To obtain the frames, a third party software 130 may be used to creates frames from the source video. It is also possible to use another method to extract the selected frames from a source video.

A plurality of frames is chosen 135 and ordered into a particular sequence 140 to create the first video file to be displayed in the email page. An optional step is to determine the number of times the video will be displayed in the email page 145, from 1 to infinity. The html code of the first video file is consequently implemented to create the corresponding number of loops for the display. This is typically realized by a third party software. The first video file created is associated to the CVI™ format 150 and posted on server 160. The CVI™ format has been created for this purpose and the server is configured to recognize this format 155.

The email is coded in a HTML format containing the text and the design of the email. A hot link is embedded 165 in the code of the email to call the first video file from the server and to display the file in the email page when the email is opened or viewed.

If the user clicks on the email page or on the first video file, a landing page is opened 170 where a second video is displayed.

The video displayed in the email is not limited to a rectangular screen, it may be almost any form such as, for example, a circle, a star, etc. . . .

Figure 2:
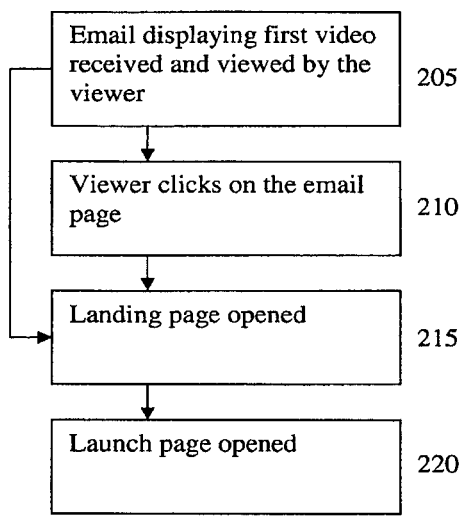
FIG. 2 is a diagram showing the sequence for the display of the first video in an email as seen by the viewer.

In FIG. 2, the diagram shows the sequence as seen by the viewer. First, the viewer receives and views the email 205 containing the first video. When the viewer clicks on the first video or on the email page 210, he/she is brought to a landing page where he/she can see a second video 215. It is also possible to automatically open the landing page when the display of the first video is finished. At the end of the second video, he/she may be automatically brought to another page 220, the launch page that may contain, for example, details for special events, an event registration, an event notification, a turnkey e-commerce site, a product launch page, special services, special promotions, a master corporate website home page, an artist page or a movie page. He/she may then interact with the launch page and enter information or request for a product related to the sent email.

Figure 3:
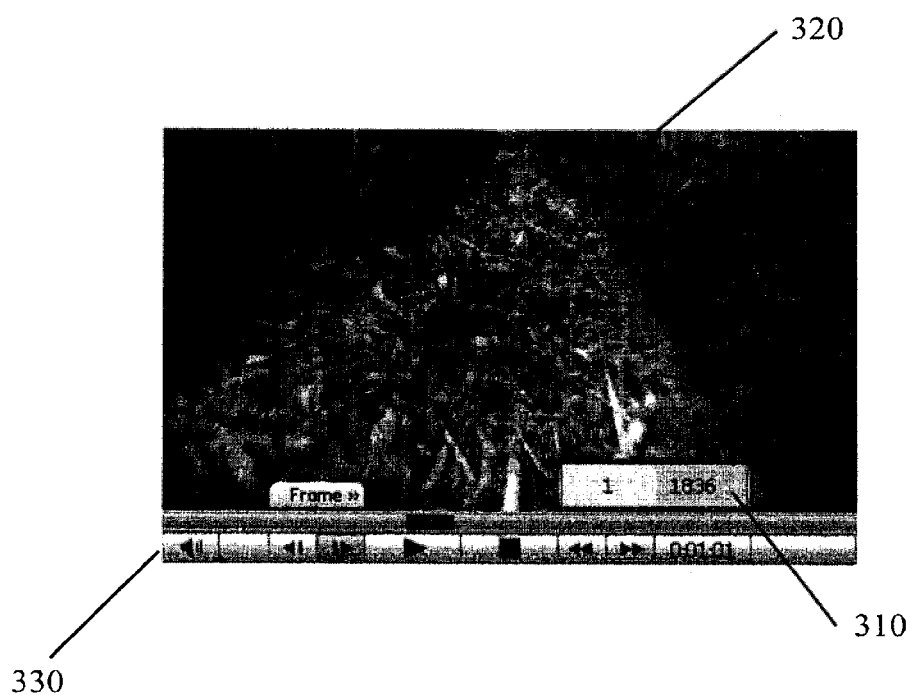
FIG. 3 is example of the frame by frame editing system.

On the landing page, many options for the video may be included, for example:

Volume slider
Information button
Stop button
Fast rewind button with Video display—Play/pause button
Fast forward with video display
Timer button with elapsed time and time remaining toggle
Navigation slider with time indicator
Adjust Picture sliders
Brightness and contrast
Saturation
Play size selector on display window
Half size or original
Fit to window In FIG. 3, an embodiment is shown for the frame by frame editing system, with a frame by frame counter 310, the image 320 and the menu 330.

It is to be understood that the video may be displayed on any computerized device that is enabled to receive and display email messages. The computerized device may be, but not limited to, a computer, a pocket PC, a PDA, a laptop, a personal e-mailing system (e.g. BLACKBERRY™) or a cellular phone which can be linked to the Internet.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method to display video content on a computerized device, the method comprising:
    defining a predetermined number of video frames to be included in a said first video;
    creating a first video file containing all of said video frames in a particular sequence;
    storing said first video file on a server;
    embedding a link in a code of an email to call said first video file from said server and to display said video frames of said first video file when said email is opened or otherwise viewed and without executing a local video player; and
    analyzing a bandwidth associated with said computerized device to provide a second video file feed to said computerized device with minimal delay.

2. The method of claim 1, further comprising: providing a landing web page comprising said second video file, said landing web page being opened when a user clicks on an email page.

3. The method of claim 2, wherein said second video file is stored on a server and said second video file is streamed onto said landing page.

4. The method of claim 1, further comprising: providing a landing page comprising said second video file, wherein said second video file begins to be downloaded when said email is opened or viewed.

5. The method of claim 1, further comprising: providing a landing page comprising a second video file which is automatically opened when said all of video frames of said first video have been displayed.

6. The method of claim 1, further comprising: determining a number of times said sequence of said frames will be displayed.

7. The method of claim 6, further comprising: implementing said code to create a loop for the display of said first video file according to said number of times.

8. A system to display video content on a computerized device, the system comprising:
    a server comprising a processor and a storage device, said server configured to store:
        (i) a first video file, the first video file comprising a predetermined number of frames, all of said frames ordered in a particular sequence;
        (ii) an email in which a link is embedded in a code of said email to call said first video file and to display said video frames of said first video file when said email is transmitted to said computerized device and opened or otherwise viewed on said computerized device and without executing a local video player; and
        (iii) instructions to analyze a bandwidth associated with said computerized device to provide a second video file feed to said computerized device with minimal delay.

9. The system of claim 8, wherein said first video file is displayed a predetermined number of times by creating a loop in said code of said email.

10. The system of claim 8, further comprising a landing page comprising said second video file, said landing page being opened when a user clicks on said email.

11. The system of claim 10, wherein said second video file is stored on a server and said second video file is streamed onto said landing page.

12. The system of claim 8, further comprising a landing page comprising a second video file, wherein said second video file of said second video file begins to be downloaded when said email is opened or viewed.

13. The system of claim 8, further comprising a landing page comprising a second video file which is automatically opened when said all of video frames of said first video file have been displayed.

* * * * *